United States Patent [19]

Ogawa et al.

[11] Patent Number: 5,786,676
[45] Date of Patent: Jul. 28, 1998

[54] CONTROL CIRCUIT FOR A WINDSHIELD WIPER SYSTEM

[75] Inventors: Tomoyuki Ogawa; Iwao Tsurubuchi, both of Gunma-ken, Japan

[73] Assignee: Mitsuba Corporation, Kiryu, Japan

[21] Appl. No.: 757,064

[22] Filed: Nov. 26, 1996

[51] Int. Cl.[6] ........................................ G05B 5/00
[52] U.S. Cl. .......................... 318/468; 318/443; 318/444; 318/483; 318/DIG. 2; 307/9.1; 307/10.1
[58] Field of Search ............................ 318/443, 444, 318/468, 483, DIG. 2; 15/200.17; 307/9.1, 10.1

[56] References Cited

U.S. PATENT DOCUMENTS

| | | | |
|---|---|---|---|
| 3,657,618 | 4/1972 | Ori et al. | 318/468 X |
| 4,306,218 | 12/1981 | Leconte et al. | 318/DIG. 2 X |
| 4,881,019 | 11/1989 | Shiraishi et al. | 318/444 X |
| 4,929,876 | 5/1990 | Kato | 318/444 |

*Primary Examiner*—Karen Masih
*Attorney, Agent, or Firm*—Marshall & Melhorn

[57] ABSTRACT

In a control circuit for a vehicle windshield wiper system, a relay energization retaining circuit forms a self-sustaining circuit jointly with a relay drive transistor for driving a wiper relay, and maintains supply of electric current to the wiper motor when the ON signal for the relay drive transistor is terminated as long as the auto stop switch is at the brake position until the auto stop switch subsequently moves on to the drive position. Therefore, when the signal which normally turns on the relay drive transistor is terminated during the time the auto stop switch is at the brake position, because the relay energization retaining circuit keeps the wiper motor running until the auto stop switch changes over from the brake position to the drive position, and the auto stop switch then takes over the task of keeping the wiper motor running until the auto stop switch changes over from the drive position to the brake position, the termination of electric current to the wiper motor always occurs at the time when the auto stop switch changes over from the drive position to the brake position so that the distance or the angular range of the overrunning of the wiper motor is fixed without regard to the timing of terminating the ON signal. Thus, according to the present invention, the rest position of the wiper blade is fixed under all operating conditions.

6 Claims, 7 Drawing Sheets

CONTROL CIRCUIT FOR A WINDSHIELD WIPER SYSTEM

TECHNICAL FIELD

The present invention relates to a control circuit for a windshield wiper system, and in particular to such a control circuit which can accurately control the rest position of the wiper blade.

BACKGROUND OF THE INVENTION

Some of the automotive windshield wiper systems are provided with the function to move the wiper blade for a prescribed time period, in addition to V continually reciprocating the wiper blade. For instance, whenever a windshield washer is operated, the wiper blade may be moved by a prescribed number of strokes.

FIG. 6 shows an example of a control circuit for a windshield wiper system which is incorporated with the function to operate the wiper system by a certain number of strokes each time the windshield washer is activated. The output shaft of the wiper motor M is coupled to an auto stop switch AS consisting of a disk coupled to the output shaft of the wiper motor M and having a circuit pattern formed thereon and a brush which is in sliding engagement with the circuit pattern so that the wiper arm is always returned to a prescribed rest position without regard to the timing at which the power switch is turned off. This is a well known feature of most conventional windshield wiper systems.

Referring to FIG. 7, first of all, it is assumed that the ignition switch IG is turned on. When the washer switch SW is closed to activate a windshield washer, an ON signal of a prescribed time duration is supplied from a washer timer 21 to a driver circuit 22. During the duration of this ON signal, the drive signal from the driver circuit 22 continues to energize a coil of a relay RY, and throws its moveable contact to a drive position or to a normally open contact NO. Thus, electric current from the battery BT is supplied to the motor M via the ignition switch IG and the normally open contact NO, and actuates the wiper arm carrying the wiper blade. While the wiper motor M is thus activated, the auto stop switch AS alternates between a drive position and a brake position. Normally, the drive position lasts a substantially larger angular range than the brake position during each stroke.

If the washer timer 21 times up while the auto stop switch AS is at the drive position, even though the coil of the relay RY is de-energized, the wiper motor M continues to run until the auto stop switch AS changes its state from the drive position to the brake position. Because of the inertia present in the path of torque transmission of the motor M, upon the changeover of the auto stop switch from the drive position to the brake position, some overrunning of the wiper blade is inevitable. But because the distance or the angular range of this overrunning is substantially constant for a given rotational speed of the wiper motor M, the rest position of the wiper blade is substantially fixed. However, if the washer timer 21 times up while the auto stop switch AS is at the brake position, the supply of electric current to the motor M is immediately shut off. Because the timing of shutting off the electric current could range over the entire angular range of the brake position of the auto stop switch AS, and the final rest position of the wiper blade could vary depending on the exact phase angle of the output shaft of the motor at the time the supply of electric current was shut off.

This problem occurs also when the wiper blade is manually shut off by turning off the wiper switch depending on the phase angle of the output shaft of the motor when the wiper switch is turned off. Also when the intermittent mode is selected, the same problem can occur each time the wiper system is turned off for intermission.

BRIEF SUMMARY OF THE INVENTION

In view of such problems of the prior art, a primary object of the present invention is to provide a control circuit for a windshield wiper system which can stop the wiper blade at a prescribed rest position at all times.

A second object of the present invention is to provide a control circuit which is suitable for use in a windshield wiper system incorporated with the function to operate the wiper blade for a prescribed number of strokes whenever the windshield washer is activated.

A third object of the present invention is to provide a control circuit for a windshield wiper system which is simple in structure and reliable in use.

According to the present invention such objects can be accomplished by providing a control circuit for a vehicle windshield wiper system. The control circuit includes a means for producing an ON signal of a certain duration. Additionally, the system includes a relay having a moveable contact, a normally open contact, a normally closed contact, and a coil for actuating the moveable contact. The contacts may be adapted to activate a wiper motor when the coil is energized. Additionally, the control circuit includes a relay drive transistor for energizing the coil when the ON signal is produced from the ON signal producing means. An auto STOP switch means is also included and is coupled to an output shaft of the wiper motor. The STOP switch means has a drive position and a brake position for maintaining supply of electrical current to the wiper motor immediately after the coil of the relay is de-energized until the auto STOP switch means takes the drive position. The circuit also includes a relay energization retaining circuit which maintains the supply of electric current to the wiper motor when the ON signal for the relay drive transistor is terminated and when the auto STOP switch means is in the brake position.

Therefore, when the ON signal is terminated during the time the auto stop switch means is at the brake position, because the relay energization retaining circuit keeps the wiper motor running until the auto stop switch means changes over from the brake position to the drive position, and the auto stop switch means then takes over the task of keeping the wiper motor running until the auto stop switch means changes over from the drive position to the brake position, the termination of electric current to the wiper motor always occurs at the time when the auto stop switch changes over from the drive position to the brake position so that the distance or the angular range of the overrunning of the wiper motor is fixed without regard to the timing of terminating the ON signal. Thus, according to the present invention, the rest position of the wiper blade is fixed under all operating conditions.

The ON signal can be generated with a manual switch, but the present invention is particularly effective when the ON signal producing means consists of a timer circuit which is connected to a windshield washer circuit so as to be activated in synchronism with activation of the windshield washer circuit, or a timer circuit which is connected to an intermittent circuit for intermittent operation of the wiper motor so as to be activated in synchronism with activation of the intermittent circuit.

The relay energization retaining circuit may comprise a control transistor which is adapted to be turned on by a voltage applied to the wiper motor, and to turn on the relay drive transistor, the control transistor being adapted to be turned off when the auto stop switch means changes over from the brake position to the drive position. Thus, the control transistor can form a self-sustaining circuit jointly with the relay drive transistor. The self-sustained state can be broken when two conditions are met, or when the ON signal is terminated and, also, the control transistor is shut off by the change over of the auto stop switch means from the brake position to the drive position. If the wiper motor is mechanically prevented from moving, for instance due to heavy accumulation of snow on the windshield, the control transistor may establish the self-sustained state, and this state may never be broken because the auto stop switch means remains at the brake position. If this continues for an extended period of time, the wiper motor could be excessively overloaded. To avoid this situation, the relay energization retaining circuit may comprise a second timer circuit for turning off the control transistor in a prescribed time period after the relay energization retaining circuit is turned on and the ON signal is terminated.

BRIEF DESCRIPTION OF THE DRAWINGS

Now the present invention is described in the following with reference to the appended drawings, which.

DETAILED DESCRIPTION OF THE PREFERRED EMBODIMENTS

Figure 1:
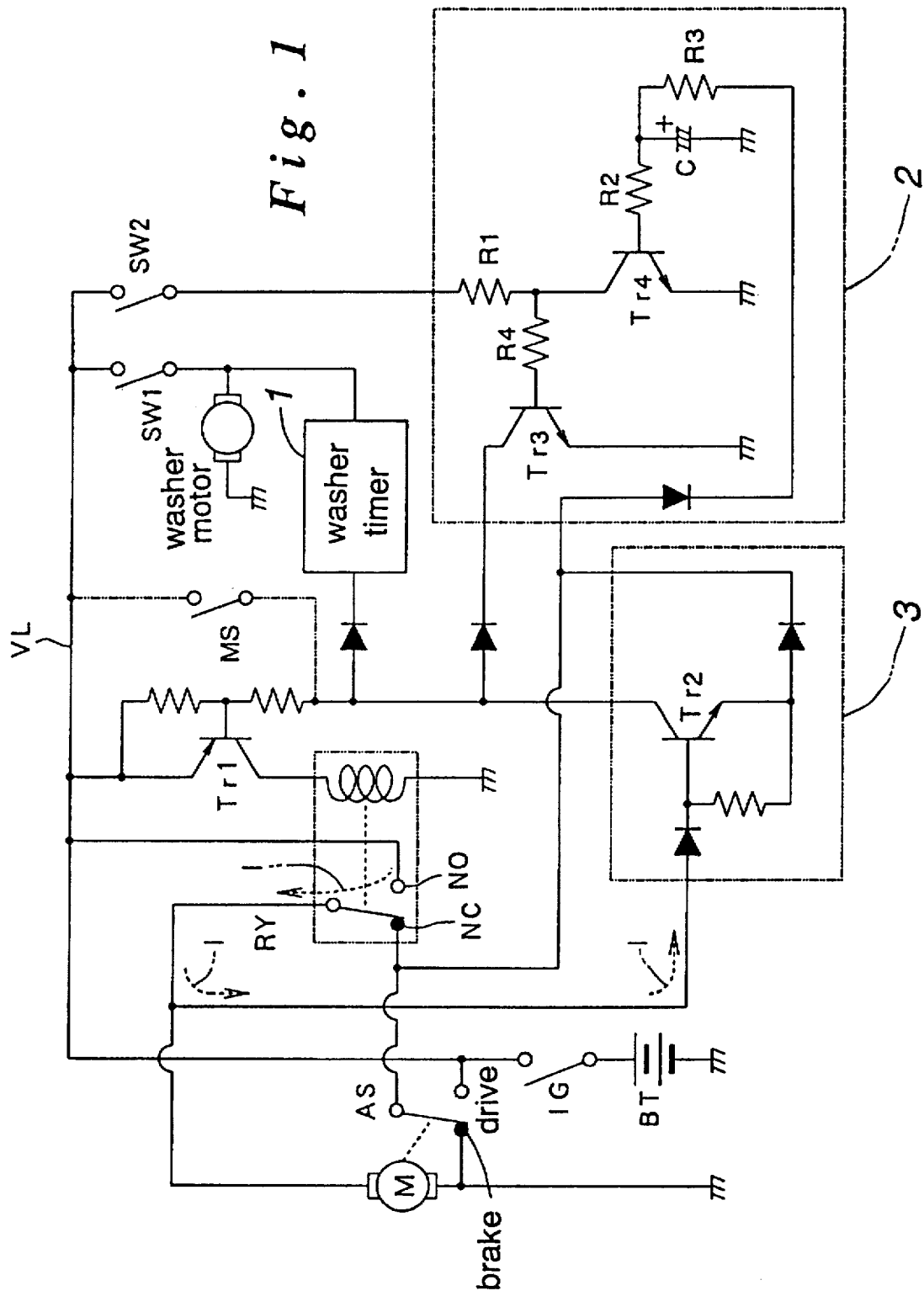
FIG. 1 is a circuit diagram of a first embodiment of the control circuit for a windshield wiper system according to the present invention.

FIG. 1 shows an essential part of a first embodiment of the control circuit for an automotive windshield wiper system according to the present invention. This wiper system may be provided with a circuit for allowing selection of high speed and low speed continual operation modes, but as it is quite conventional, it is simplified in FIG. 1. In addition to the circuit for the continual operation modes, this wiper system is provided with a circuit for carrying out an intermittent mode and a washer mode as shown in FIG. 1. When the washer mode is selected, as washing fluid is thrown onto the windshield, the wiper blade is moved by a prescribed number of strokes.

Referring to FIG. 1, the positive terminal of a battery BT serving as a power source is connected to a control power line VL via an ignition switch IG. The control power line VL is connected to a washer timer 1 and an intermittent timer 2 via a washer switch SW1 and an intermittent switch SW2, respectively. The control power line VL is also connected to an emitter of a relay drive transistor Tr1, and a relay coil of a relay RY is connected between a collector of this transistor Tr1 and the ground line. A manual switch MS is connected to the base of the relay drive transistor Tr1 so as to selectively ground the base of the transistor Tr1 via a resistor. A normally open contact NO of a contact set of this relay RY is also connected to the control power line VL, and an associated moveable contact of the relay RY is connected to an input terminal of a wiper motor M.

The output shaft of the wiper motor M is provided with an auto stop switch AS which switches over between a drive position and a brake position in synchronism with the rotation of the output shaft of the wiper motor M. The drive position extends over a substantially larger range of angle of the wiper motor M than the brake position. The other input terminal of the wiper motor M is grounded. A brake terminal corresponding to the brake position of the auto stop switch AS is connected to the ground line while a drive terminal corresponding to the drive position of the auto stop switch is connected to the control power line VL. A common terminal of the auto stop switch AS is connected to a normally closed contact NC of the relay RY.

The output terminals of the washer timer 1 and the intermittent timer 2, which go low (grounded) when the timer is activated, are connected to the base of the relay drive transistor Tr1 via a diode and a resistor in each case. The base of the relay drive transistor Tr1 is connected to the collector of a control transistor Tr2 which forms a relay energization retaining circuit 3. The emitter of the control transistor Tr2 is connected to the normally closed contact NC of the relay RY via a diode. The base of the control transistor Tr2 is connected to a node between the input terminal of the wiper motor M and the common contact of the relay RY via a diode. The control transistor Tr2 of the relay energization retaining circuit 3 becomes conductive when a voltage is applied to the wiper motor M, and this in turn causes the relay drive transistor Tr1 to become conductive provided that the auto stop switch AS is in the brake position. Therefore, the control transistor Tr2 retains the common contact in engagement with the normally open contact NO even after the output terminals of the two timers have both gone high provided that the auto stop switch AS is in the brake position.

The intermittent timer 2 comprises a transistor Tr3 having an emitter which is grounded, a collector which serves as the above mentioned output terminal, and a base which is connected to a collector of another transistor Tr4. The collector of the transistor Tr4 is also connected to the switch SW2 via a resistor R1, and the emitter of the transistor Tr4 is grounded. A resistor R2 and a capacitor C are connected across the base of the transistor Tr4 and the ground, and the node between the resistor R2 and the capacitor C is connected, via a diode and a resistor R3, to the normally closed contact NC.

Now the operation of this circuit when the washer switch SW1 is closed is described in the following. When the washer switch SW1 is closed, the washer timer 1 is activated, and it normally times up while the auto stop switch AS is at the drive position as indicated by the imaginary line of the time chart given in FIG. 2. As a result, the relay RY is de-energized. However, during the time the auto stop switch is at the drive position, electric current continues to be supplied to the wiper motor M via the drive terminal of the auto stop switch AS and the normally closed contact NC of the relay RY, and the wiper motor M continues to rotate. As soon as the auto stop switch AS switches over from the drive position to the brake position by the rotation of the wiper motor M, supply of electric current to the wiper motor M is terminated, and the wiper motor comes to a stop after overrunning by a certain angle. Because this angle of overrunning is not only small but also substantially fixed, the rest position of the wiper blade is therefore substantially fixed under normal conditions. This angle of overrunning is so short that it is not shown in FIG. 2.

Figure 2:
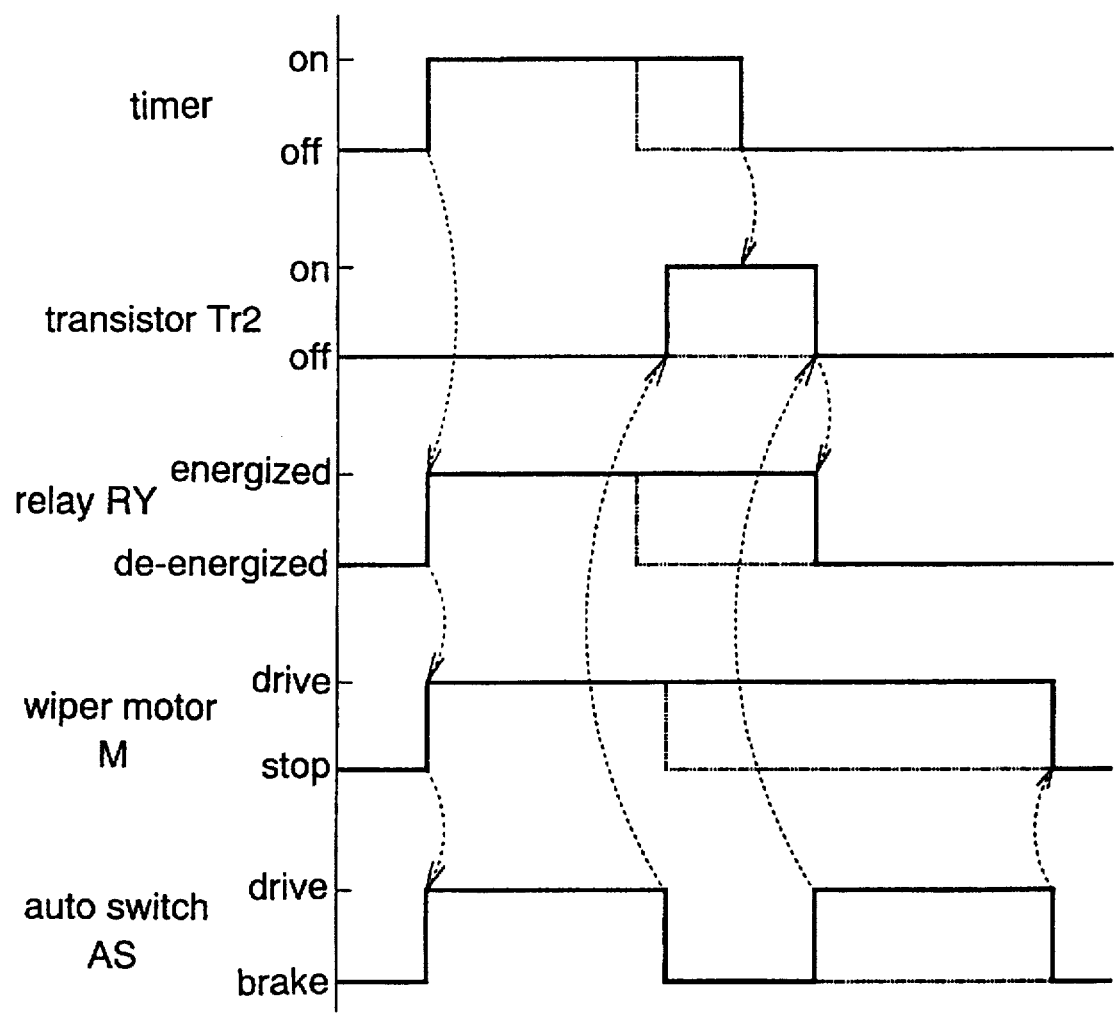
FIG. 2 is a time chart for describing the mode of operation of the first embodiment.

Suppose that the time up of the washer timer is delayed, for instance because of a change in the ambient temperature as indicated by the solid line in FIG. 2. If the auto stop switch AS has switched over from the drive position to the brake position before the washer timer times up, the control transistor Tr2 is conductive because its emitter which has been pulled up by the voltage supplied via the drive terminal of the auto stop switch AS is now grounded via the brake terminal of the auto stop switch AS.

Thus, if the washer timer 1 times up while the auto stop switch AS is at the brake position, although the timer signal from the washer timer 1 which normally provides a ON signal for the relay drive transistor Tr1 is shut off, because the control transistor Tr2 continues to be conductive as long as the relay RY continues to be energized by the electric current supplied to the control transistor Tr2 as indicated by the dotted line I in FIG. 1, the relay drive transistor Tr1 continues to be conductive, and keeps the relay RY energized. In other words, in this state, the control transistor Tr2 forms a self-sustaining circuit in cooperation with the relay drive transistor Tr1 so that the relay is kept energized even after the ON signal ceases to be present.

However, as soon as the auto stop switch AS switches over from the brake position to the drive position, the above mentioned pulled up state of the control transistor Tr2 is achieved so that the control transistor Tr2 is turned off, the relay drive transistor Tr1 is also turned off, and the relay RY is de-energized. In this state, electric current continues to be supplied to the wiper motor M via the drive terminal of the auto stop switch AS and the normally closed contact NC of the relay RY, and the wiper motor M continues to turn. Once the auto stop switch AS switches over from the drive position to the brake position, the wiper motor M comes to a stop after overrunning a certain small angle in the same way as the normal condition.

Thus, according to this embodiment, even after the washer timer 1 has timed up, as long as the auto stop switch AS is in the brake position, because the relay energization retaining circuit 3 keeps the relay energized, the timing up of the washer timer 1 would not cause the wiper motor M to stop. The auto stop switch therefore moves on to the drive position, and this causes the control transistor Tr2 to be shut off, and the coil of the relay RY to be de-energized as a result. The auto stop switch AS eventually changes over to the brake position, and this finally brings the wiper motor to a stop after going through a usual and expected small angle of overrunning. This ensures the wiper blade to stop at the normal rest position.

The above described mode of operation is not limited to that resulting from the activation of the windshield washer. In this embodiment, an intermittent timer 2 is connected in parallel with the washer timer 1 so that a similar action may occur also when the intermittent timer 2 is activated. Similarly, also when the manual switch MS is used, this embodiment allows the wiper blade to come to a stop at the fixed rest position without regard to the timing at which the manual switch is turned off.

The operation of the system when the intermittent mode is selected is described in the following. Initially, the auto stop switch AS is at the brake position, and the moveable contact of the relay RY is connected to the normally closed contact NC. Therefore, the capacitor C is not charged, and no base current is supplied to the transistor Tr4, thereby turning off the transistor Tr4. When the switch SW2 is closed in this state, because the emitter of the transistor Tr3 is grounded, and the base current is supplied to the Tr3 via the resistors R11 and R4, the transistor Tr3 turns on. This causes the transistor Tr1 to be turned on also. As a result, the relay RY is energized, and the electric motor M can draw electric current via the normally open contact NO of the relay RY. As soon as the motor M starts turning, the auto stop switch AS changes over to the drive position, and the transistor Tr4 is turned on. This in turn causes the transistor Tr3 to be turned off. As a result, the relay Tr1 is turned off, and the relay RY is de-energized. But, the motor keeps turning by virtue of the electric current supplied to the motor M via the drive terminal of the auto stop switch AS, and the normally closed contact NC of the relay RY. Meanwhile, the capacitor C is charged via the resistor R3.

When the auto stop switch is switched over to the brake position after the wiper blade has executed a single cycle of wiping operation, the supply of base current to the transistor via the resistors R2 and R3 is terminated. However, because the capacitor C is fully charged at this point, and supplies the base current, the transistor Tr4 remains turned on, and the transistor Tr3 remains turned off. Therefore, the wiper motor M is not activated for a prescribed timer period determined by the time constant defined by the capacitor C and the resistor R2. Once the capacitor C is discharged to a certain level, the transistor Tr4 loses is base current, and turns off, thereby turning on the transistor Tr3. As a result, the transistor Tr1 is turned on, and the relay RY is energized. Thus, electric current is again supplied to the electric motor M, and the previously mentioned state is restored. In other words, although the wiper motor starts turning as soon as the switch SW2 is closed, whenever the motor reaches the brake position, the rotation of the motor is interrupted for a time period determined by the time constant C·R3.

When this intermittent operation mode is turned off by turning off the switch SW2 while the auto stop switch AS is at the drive position, the transistor Tr3 is immediately turned off, and the transistor Tr3 is turned off as a result. However, by virtue of the electric current supplied to the motor M via the drive terminal of the auto stop switch AS and the normally closed contact NC of the relay RY, the motor continues to turn until the auto stop switch AS switches over to the brake position. When the switch SW2 is turned off while the auto stop switch AS is at the brake position, the transistor Tr3 is immediately turned off, but the transistor Tr2 remains turned on by virtue of the base current drawn from the normally open NO contact of the relay RY. However, as soon as the auto switch AS switches over to the drive position, the transistor Tr2 is turned off, and the motor continues to turn by drawing electricity from the normally closed contact NC of the relay, and the drive terminal of the auto switch AS. Again, as soon as the auto switch AS switches over to the brake position, the motor M comes to a stop after going through a usual and expected small angle of overrunning. This ensures the wiper blade to stop at the normal rest position without regard to the timing of turning off the switch SW2.

Figure 3:
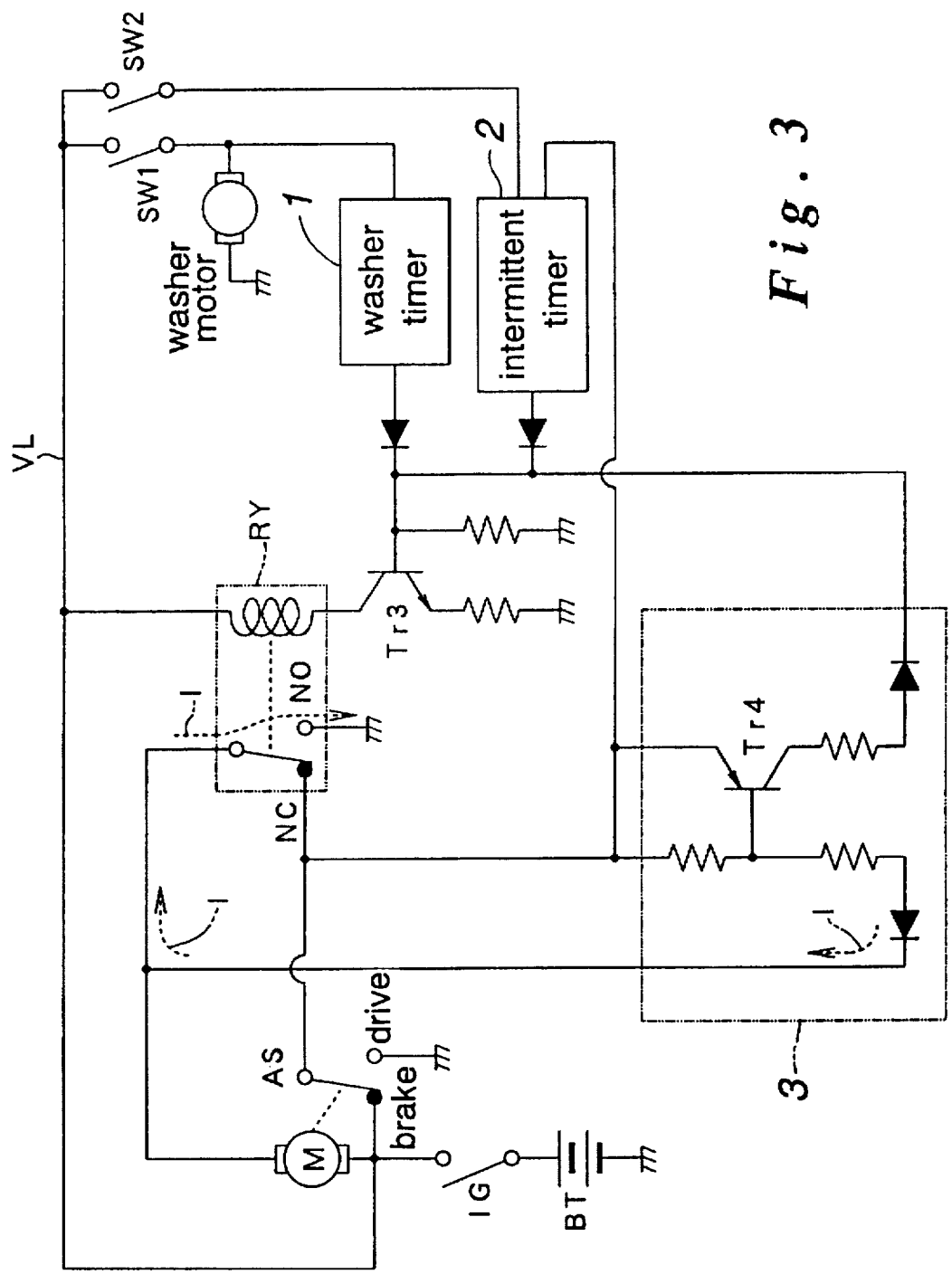
FIG. 3 is a view similar to FIG. 1 showing a second embodiment of the present invention.

There are other possible arrangements for the auto stop switch, and the present invention can be adapted to any particular auto stop switch arrangement without departing from the inventive concept of the present invention. For instance, FIG. 3 shows an arrangement in which the brake terminal of the auto stop switch AS is connected to the power line VL while the drive terminal thereof is grounded as opposed to the first embodiment in which the brake terminal of the auto stop switch AS is grounded while the drive terminal thereof is connected to the power line. In FIG. 3, the parts corresponding to those of the previous embodiment are denoted with like numerals.

Referring to FIG. 3, one of the input terminals of the wiper motor M is connected to the positive terminal of the battery BT via the ignition switch IG, and the other input terminal of the wiper motor M is connected to the moveable contact of the relay RY. The normally open contact NO of the relay is grounded while the normally closed contact NC of the relay RY is connected to the common terminal of the auto stop switch AS. The brake terminal of the auto stop switch AS is connected to the node between the input terminal of the wiper motor M and the positive terminal of the battery. The coil of the relay RY is connected between the power line VL and a relay drive transistor Tr3 which corresponds to the relay drive transistor Tr1 of the first embodiment so as to be energized when the relay drive transistor Tr3 is turned on.

The base of the relay drive transistor Tr3 is connected to the output terminals of the timers 1 and 2 so that the relay drive transistor Tr3 is turned on by the ON signal from either one of the timers 1 and 2. The base of the relay drive transistor Tr3 is also connected to the output of a relay energization retaining circuit 3 which includes a control transistor Tr4. The relay energization retaining circuit 3 produces a ON signal for the relay drive transistor Tr3 when the auto stop switch AS is at the brake position and the normally open contact NO of the relay RY is closed. The mode of operation of the second embodiment is similar to that of the first embodiment except for that the voltage levels of the circuit at the drive position and the brake position of the auto stop switch AS are generally reversed.

Figure 4:
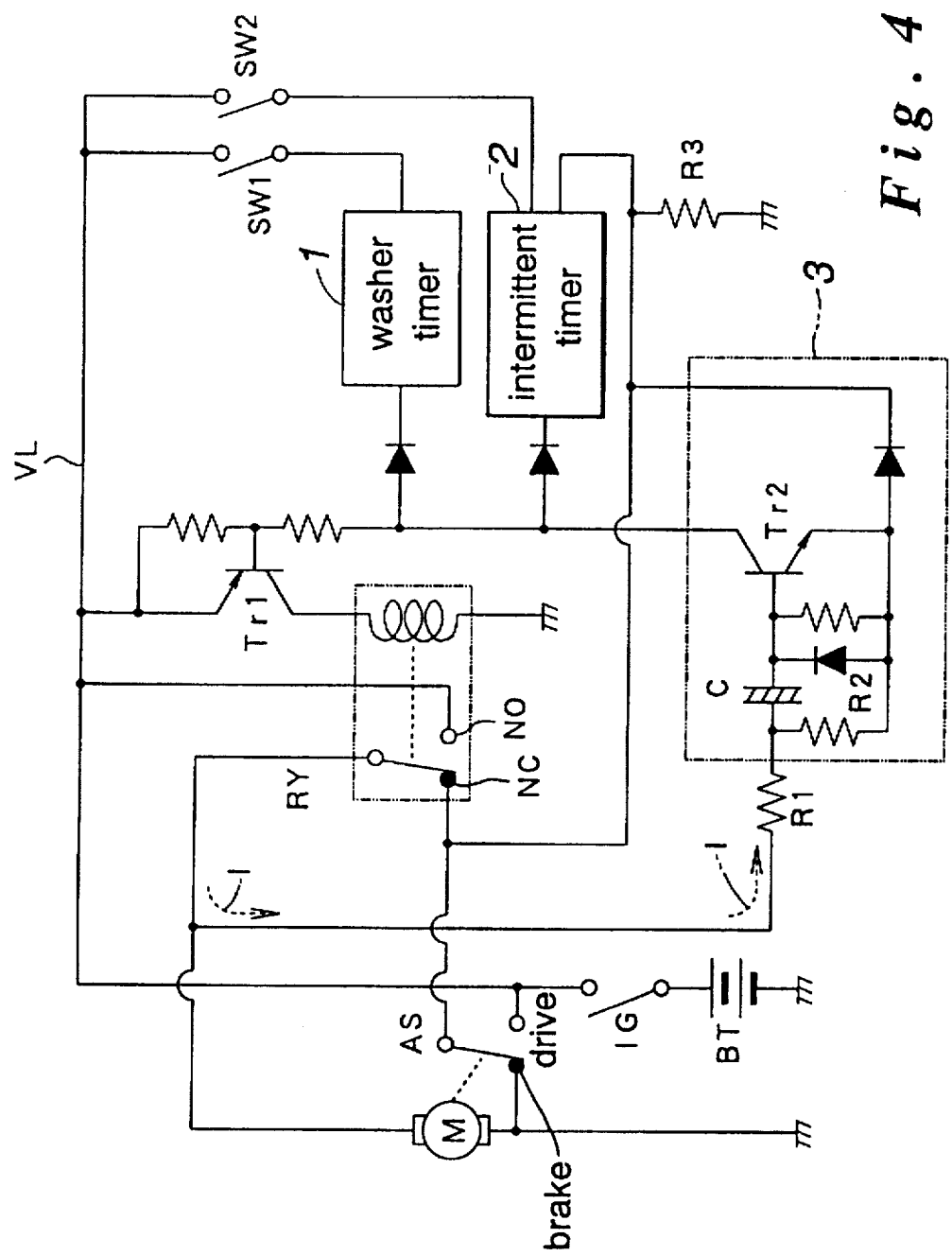
FIG. 4 is a view similar to FIG. 1 showing a third embodiment of the present invention.

FIG. 4 shows a third embodiment of the present invention which can prevent excessive overloading of the wiper motor even when the movement of the wiper blade is obstructed by snow accumulation, freezing and other causes. In FIG. 4, the parts corresponding to those of the previous embodiments are denoted with like numerals.

In this embodiment, the base of the relay drive transistor Tr1 is connected, via a resistor, to the collector of the control transistor Tr2 forming a part of the relay energization retaining circuit 3. The emitter of the control transistor Tr2 is connected to the normally closed contact NC of the relay RY via a diode. The base of the control transistor Tr2 is connected to a node between the input terminal of the wiper motor M and the moveable contact of the relay RY via a resistor R1 and a capacitor C which are connected in series. A resistor R2 is connected to a node between the resistor R1 and the capacitor C at its one end and to the emitter of the control transistor Tr2 at its other end. The resistor R2 and the capacitor C form a time constant circuit. The emitter of the control transistor Tr2 is connected to an output terminal of the intermittent timer 2, and the node between them is grounded via a resistor R3.

Now the intermittent operation mode of this embodiment is described with reference to the flow chart of FIG. 5.

When the intermittent switch SW2 is turned on, the intermittent timer 2 is activated, and, normally, during the time the auto stop switch AS is at the drive position, the output terminal of the intermittent timer 2 goes high, thereby de-energizing the relay RY. However, because electric current continues to be supplied to the wiper motor M via the drive terminal of the auto stop switch AS and the normally closed contact NC of the relay RY during the time the auto stop switch AS is at the drive position, the wiper motor M continues to turn. Once the auto stop switch AS switches over from the drive position to the brake position, the supply of electric current to the wiper motor M is terminated, and the wiper motor M stops after going though a regenerative braking action because the input terminal is grounded during this process.

This braking action of the wiper motor M occurs in a substantially predictable manner, and the resulting overrunning angle of the wiper motor M is substantially fixed. Again, this overrunning distance is so short that it is not shown in FIG. 4. Therefore, the rest position of the wiper blade is substantially the same each time. In the intermittent mode, the wiper motor M is repeatedly operated and stopped in an intermittent manner. In this embodiment, during the time the capacitor C is being charged, the charging current flowing through the control transistor Tr2 continues to turn on the control transistor Tr2.

Figure 5:
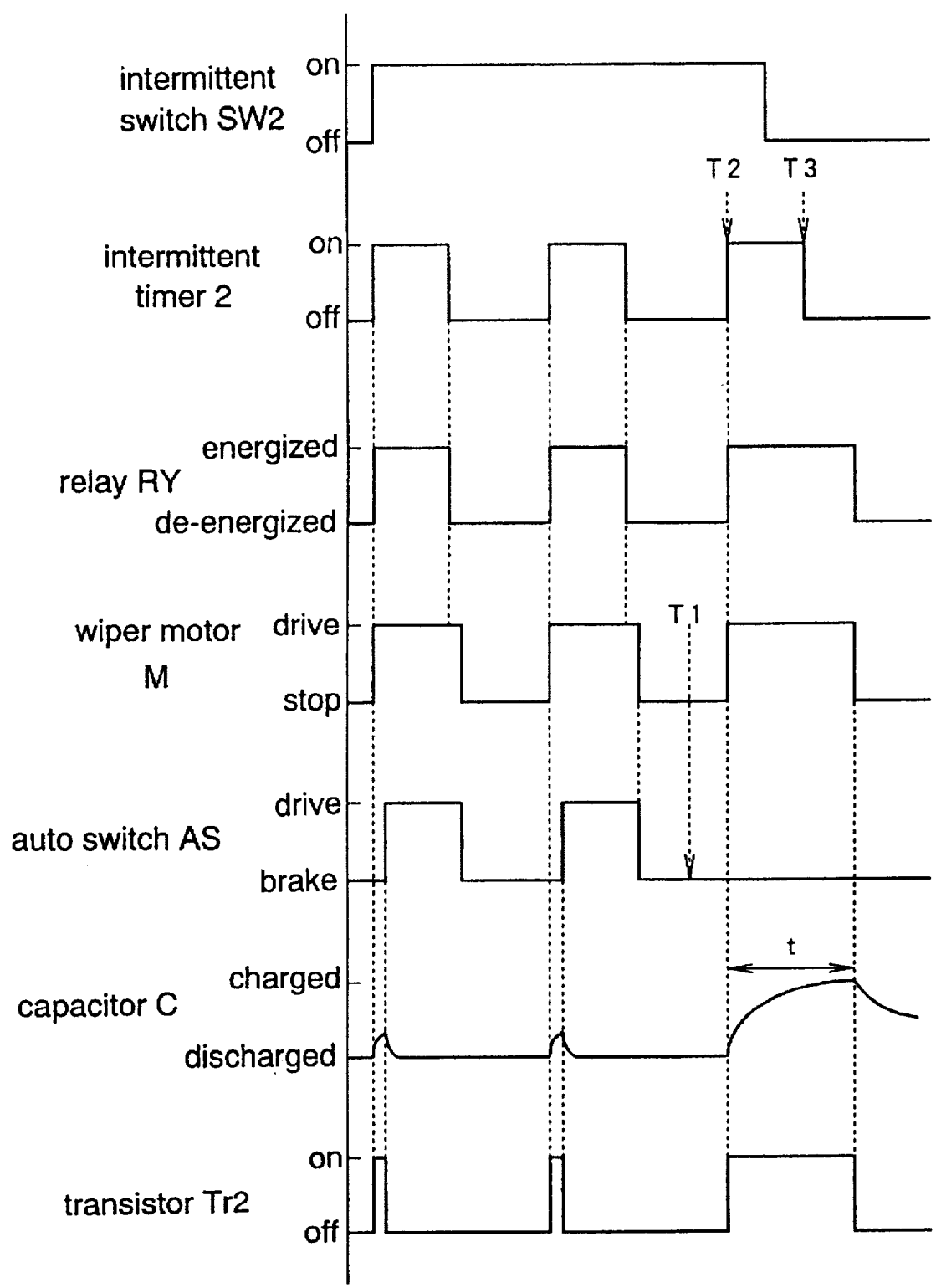
FIG. 5 is a time chart for describing the mode of operation of the third embodiment of the present invention.
Figure 6:
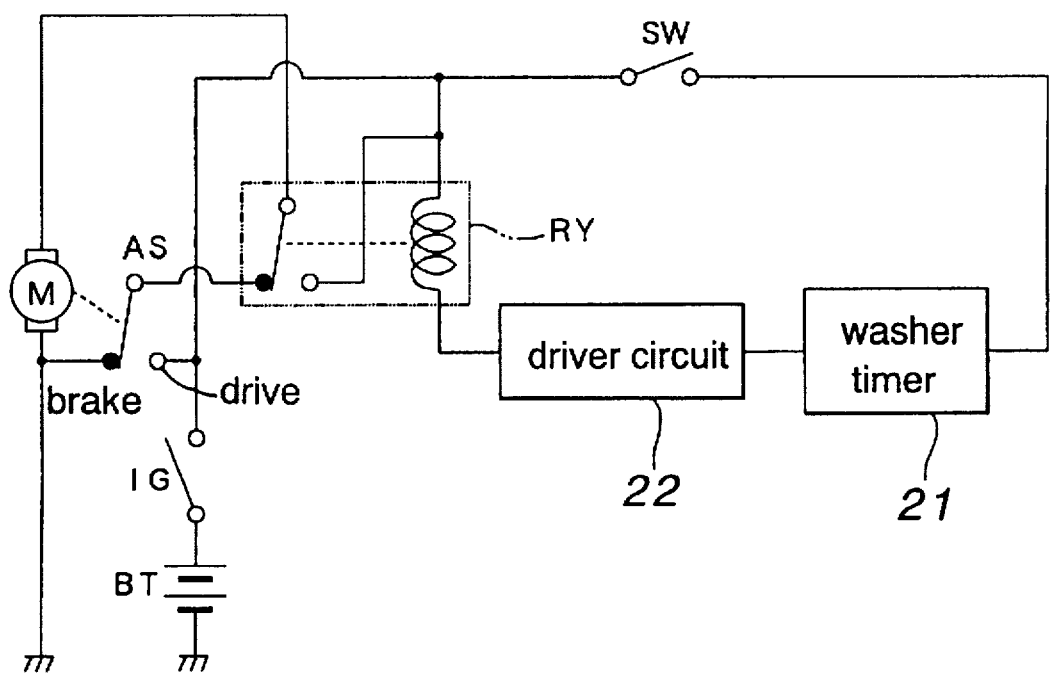
FIG. 6 is a circuit diagram showing a conventional control circuit for a windshield wiper system.
Figure 7:
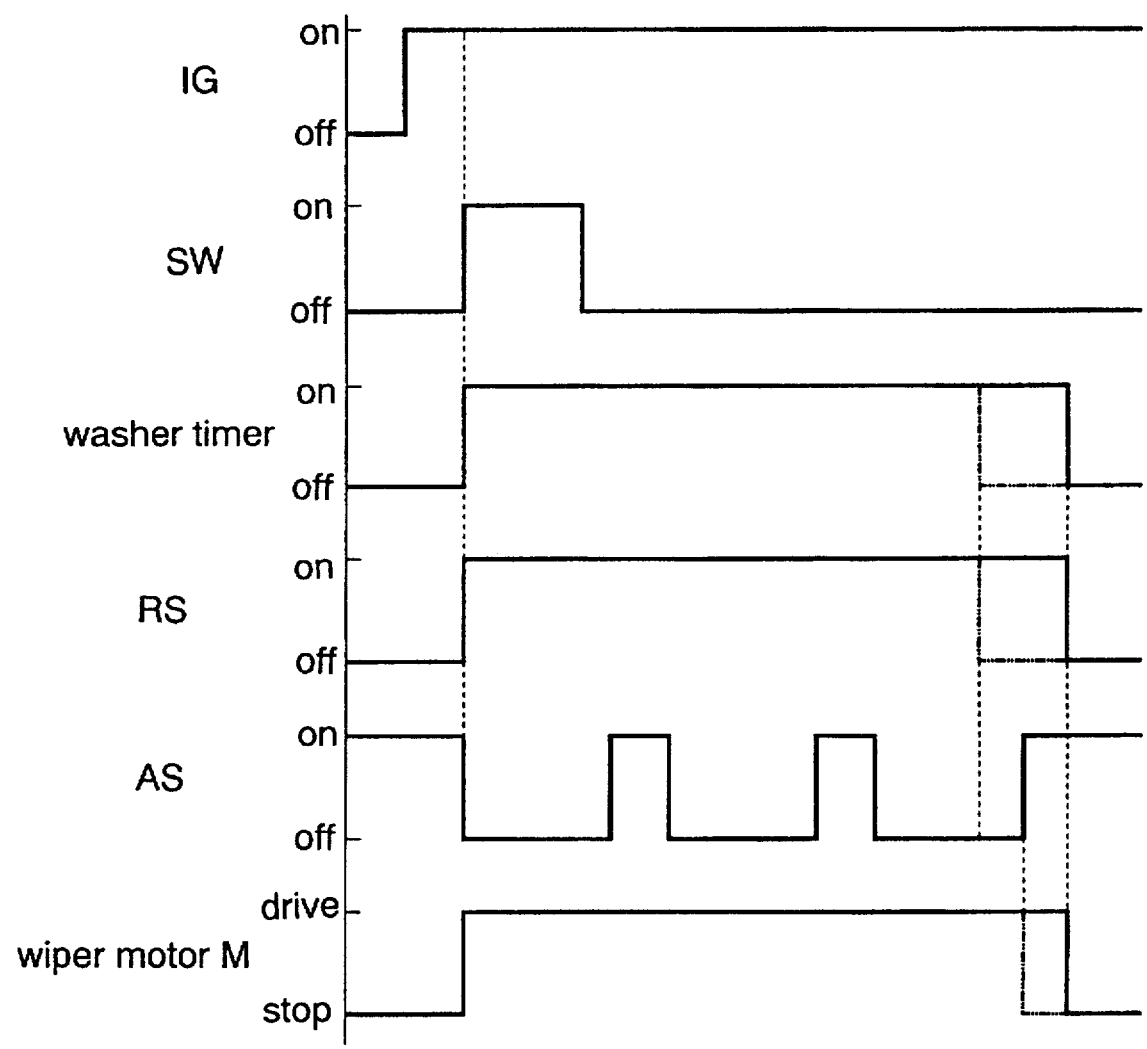
FIG. 7 is a time chart for describing the mode of operation of the conventional control circuit of FIG. 6.

Suppose that the wiper motor M is restrained from turning from its rest position for some reason at time point T1 in FIG. 5. If the switch SW2 for the intermittent timer 2 is turned on at time point T2, the relay RY can be then energized, and electric current can flow into the wiper motor M via the normally open contact NO of the relay RY. At this point, because the auto stop switch AS remains in the brake position, the capacitor C continues to be charged, and the control transistor Tr2 therefore continues to be conductive.

Under normal conditions, as soon as the auto stop switch AS changes over from the brake position to the drive position, the control transistor Tr2 is turned off, and the subsequent switch over from the drive position to the brake position causes the wiper motor M to come to a stop. However, when the wiper arm is restrained as mentioned above, even when the output from the intermittent switch SW2 or the washer switch SW1 is cut, because the control transistor Tr1 continues to be conductive, electric current continues to be supplied to the wiper motor M. Once the capacitor C is fully charged (after elapsing a time period t), the control transistor Tr2 is turned off, and the relay RY is de-energized, thereby stopping the supply of electric current to the wiper motor M. The capacitor C is discharged via the resistor R2. The resistor R3 maintains the control transistor Tr2 conductive and prevents the wiper motor M from coming to a stop during the transitional phase when the auto stop switch AS switches over from the brake position to the drive position.

Thus, according to this embodiment, the control transistor Tr1 is turned on only for a prescribed time period determined by the capacitor C, and the control transistor Tr2 is turned off upon full charging of the capacitor C. Therefore, even when the wiper motor is restrained from moving, the supply of electric current to the wiper motor M is terminated within a short period of time, and the wiper motor M is prevented from being excessively overloaded.

Although the present invention has been described in terms of specific embodiments thereof, it is possible to modify and alter details thereof without departing from the spirit of the present invention.

What we claim is:

1. A control circuit for a vehicle windshield wiper system, comprising:

means for producing an ON signal of a certain duration;

a relay having a moveable contact, a normally open contact, a normally closed contact, and a coil for actuating said moveable contact, said contacts being adapted to activate a wiper motor when said coil is energized;

a relay drive transistor for energizing said coil when said ON signal is produced from said ON signal producing means;

auto stop switch means coupled to an output shaft of said wiper motor and having a drive position and a brake position for maintaining supply of electric current to said wiper motor immediately after said coil of said relay is de-energized until said auto stop switch means takes said drive position; and a relay energization retaining circuit which maintains supply of electric current to said wiper motor when the ON signal for the relay drive transistor is terminated as long as said auto stop switch means is at said brake position until said auto stop switch means subsequently moves on to said drive position.

2. A control circuit according to claim 1, wherein said ON signal producing means comprises a timer circuit which is connected to a windshield washer circuit so as to be activated in synchronism with activation of said windshield washer circuit.

3. A control circuit according to claim 1, wherein said ON signal producing means comprises a timer circuit which is connected to an intermittent circuit for intermittent operation of said wiper motor so as to be activated in synchronism with activation of said intermittent circuit.

4. A control circuit according to claim 1, wherein said ON signal producing means comprises a manual switch.

5. A control circuit according to claim 1, wherein said relay energization retaining circuit comprises a control transistor which is adapted to be turned on by a voltage applied to said wiper motor, and to turn on the relay drive transistor, said control transistor being adapted to be turned off when said auto stop switch means changes over from said brake position to said drive position.

6. A control circuit according to claim 5, wherein said relay energization retaining circuit comprises a second timer circuit for turning off said control transistor in a prescribed time period after said relay energization retaining circuit is turned on and said ON signal is terminated.

* * * * *